United States Patent [19]

Schneider et al.

[11] 4,055,879
[45] Nov. 1, 1977

[54] ROLLER

[75] Inventors: Siegfried Schneider, Durrnhaar; Kurt Thate, Munich; Erwin Geyken, Munich; Horst Kempe, Munich; Stephan Macher, Munich, all of Germany

[73] Assignee: AGFA-Gevaert, A.G., Leverkusen, Germany

[21] Appl. No.: 689,856

[22] Filed: May 25, 1976

Related U.S. Application Data

[62] Division of Ser. No. 446,923, Feb. 28, 1974, Pat. No. 3,919,754, which is a division of Ser. No. 375,850, July 2, 1973, Pat. No. 3,823,456.

[30] Foreign Application Priority Data

July 1, 1972 Germany .............................. 2232424

[51] Int. Cl.² ............................................. B21B 31/08
[52] U.S. Cl. ..................................................... 29/123
[58] Field of Search .............. 29/123, 132, 119, 129.5, 29/130

[56] References Cited

U.S. PATENT DOCUMENTS

| 2,356,007 | 8/1944 | Sanders | 29/119 X |
| 3,139,826 | 7/1964 | Rainwater | 29/132 X |
| 3,611,028 | 10/1971 | Whitmore | 29/132 X |
| 3,912,901 | 10/1975 | Strella et al. | 29/132 X |
| 3,971,115 | 7/1976 | Schneider et al. | 29/123 X |

FOREIGN PATENT DOCUMENTS

| 1,280,873 | 11/1961 | France | 29/123 |
| 323,089 | 12/1929 | United Kingdom | 29/123 |
| 364,865 | 1/1932 | United Kingdom | 29/123 |
| 468,482 | 7/1937 | United Kingdom | 29/123 |
| 540,535 | 10/1941 | United Kingdom | 29/123 |

Primary Examiner—Alfred R. Guest
Attorney, Agent, or Firm—Michael J. Striker

[57] ABSTRACT

A roller to be used in apparatus for wet treatment of photographic material comprises a hollow metallic core and two inserts with coupling shafts provided therein. A coat of chemically resistant thermoplastic material is applied around and sealingly surrounds the core to protect it from the corrosive action of media used in the wet treatment process. The outer surface of the thus coated roller is thereupon machined to a high-quality finish.

8 Claims, 4 Drawing Figures

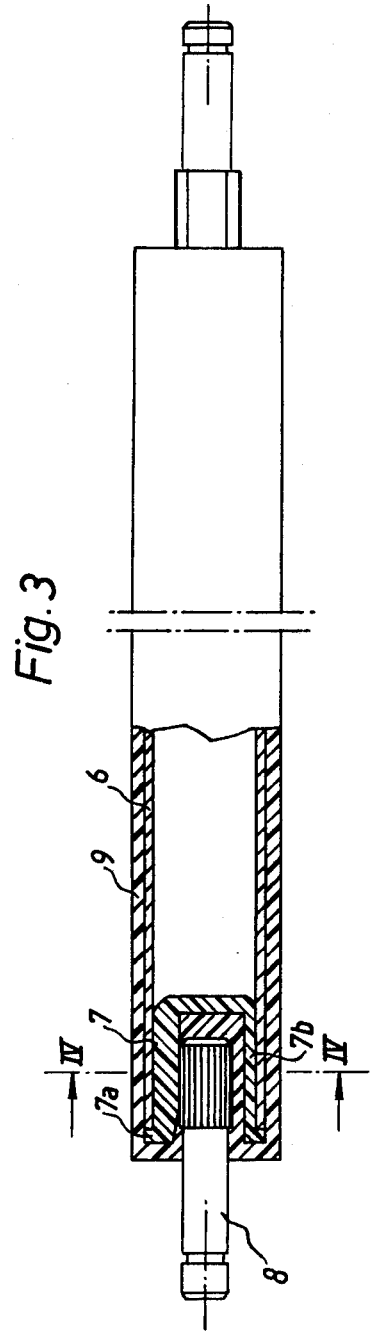
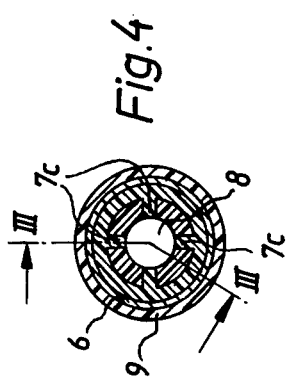

ROLLER

CROSS-REFERENCE TO RELATED APPLICATION

This application is a division of our copending application Ser. No. 446,923, filed Feb. 28, 1974, now U.S. Pat. No. 3,919,754 issued Nov. 18, 1975, which application is a division of Ser. No. 375,850, filed July 2, 1973, now U.S. Pat. No. 3,823,456 issued July 16, 1974.

BACKGROUND OF THE INVENTION

The present invention relates to rollers, especially to rollers whose length greatly exceeds their diameter, which can be used in apparatus for wet treatment of strip material, such as photographic roll film or prints. The invention also relates to a method of making such rollers.

In many types of apparatus for wet treatment of photographic films or the like, a web or sheet is transported along one or more straight and/or U-shaped paths by means of a conveyor system employing a number of rollers whose ends are provided with shafts or analogous mounting or coupling means for convenient installation in the frame. The rollers are disposed singly or in pairs and are normally provided with smooth external surfaces to reduce the likelihood of damage to the photosensitive emulsion. The surface finish and the material of the rollers depend on the nature of fluids which act upon the rollers during treatment of the processed material. For example, rollers which are presently used in developing tanks for photographic material comprise cores consisting of high-quality steel and coats of rubber. Other materials are used for those rollers which transport the film in a fixing or rinsing tank. The rollers at the drying station normally comprise a stainless core surrounded by a coating of phenolic resin. In many instances, the entire roller consists of high-quality steel. The manufacturing cost of such a large variety of rollers for use in a combined developing, fixing, rinsing and drying apparatus is extremely high, especially since the rollers must be produced in small numbers. Moreover, an unskilled workman is likely to confuse the rollers during assembly so that a roller which can stand the action of media in a fixing tank but is installed in the developing tank, or vice versa, is likely to be destroyed after a relatively short period of use. This can lead to prolonged interruptions in operation and substantial losses in output.

SUMMARY OF THE INVENTION

It is an object of the present invention to provide a versatile and chemically resistant roller which may be mass-produced in large numbers at a low cost.

It is an other object of the invention to provide a roller which may be used in all stages of treatment of photographic material, regardless of the nature of fluids which come in contact therewith in various portions of the developing apparatus.

It is a further object of the present invention to provide light-weight, rugged, reliable and long lasting rollers which can be used interchangeably with similar rollers at any one of a plurality of processing stations in a photographic developing or like apparatus.

A concomitant object of the present invention is to provide a roller whose surface quality and chemical resistivity satisfy the requirements imposed on rollers in various stages of development of photographic material.

It is a further object of the invention to provide a novel method of manufacturing chemically resistant rollers.

One feature of the invention resides in the provision of a roller which comprises a tubular metallic core provided with an external coat of chemically resistant thermoplastic material, and two inserts, portions of which are received in the end portions of the metallic core and which are provided with shafts or analogous coupling or mounting means to facilitate the mounting of the roller in a frame or the like.

The thermoplastic material of the coat is chosen so as to assure permanent bonding between the external surface of the metallic core and the coat applied thereto. Experience has shown that a roller produced in this matter is superior to conventional rollers because the metallic core offers the necessary rigidity and resistance to external forces, even under most unfavorable conditions, while the coat which contacts the material to be treated is chemically resistant, and advantageously also wear-resistant, thus protecting the metallic core from the corrosive influence of various media being applied to the photographic material during treatment.

The novel features which are considered as characteristic of the invention are set forth in particular in the appended claims. The improved roller itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is a partly elevational and partly axial sectional view of a second roller; and FIG. 4 is a sectional view as seen in the direction of arrows from the line IV—IV of FIG. 3.

DESCRIPTION OF THE PREFERRED EMBODIMENTS

Figure 1:
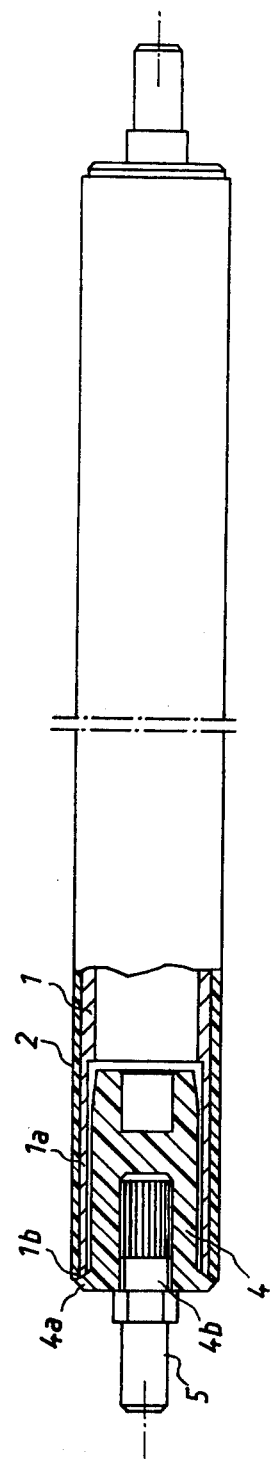
FIG. 1 is a partly elevational and partly axial sectional view of a roller which embodies one form of the invention.

A roller which embodies one form of the invention is shown in FIG. 1. This roller comprises a tubular metallic core 1 which is permanently bonded to a cylindrical sleeve or coat 2 of thermoplastic material. In the currently preferred embodiment, the metallic core 1 is made of aluminum; however, it is equally possible to use other materials which are relatively inexpensive and are not highly resistant to corrosion, e.g., when subjected to the action of chemically active media used in the wet treatment of photographic materials. The only important requirement the material of the core 1 has to satisfy, in addition to resistance to external forces acting upon the roller, is to enter into a permanent bond with the material of the coat 2. The currently preferred materials for the making of the thermoplastic coat 2 are hard polyvinyl chloride, crystalline polyamide, polypropylene, polyethylene or their combinations.

Figure 2:
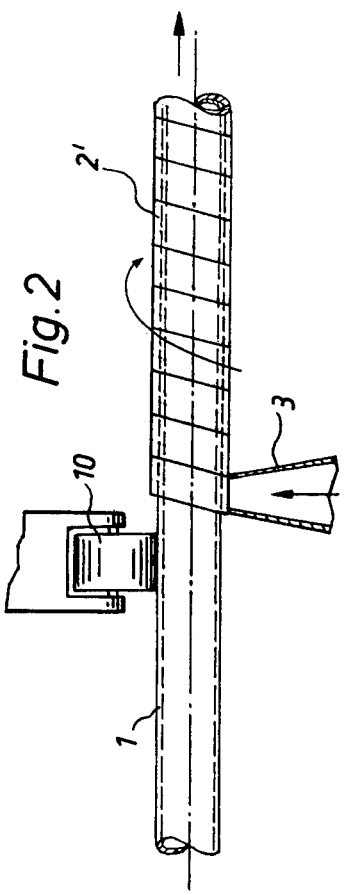
FIG. 2 is a fragmentary schematic partly elevational and partly sectional view of a portion of an apparatus for the making of rollers of the type shown in FIG. 1.

The thickness of the coat 2 preferably exceeds 2 millimeters. The reasons for such rather pronounced thickness will be discussed later in connection with the description of steps following the application of the coat 2 to the core 1. Even though there is a wide variety of methods of applying such a relatively thick coat of thermoplastic material to a cylindrical core, the currently preferred method is illustrated in FIG. 2. This method is an extrusion process according to which a continuous aluminum tube 1' is rotated about its axis and is moved lengthwise by a carriage, not shown, in the direction indicated by an arrow so as to advance along an extruder nozzle 3 forming part of an extruding apparatus of conventional design. However, it is to be understood that this relative movement can also be effected in any other known manner, such as moving the extruder nozzle 3 longitudinally of the tube 1' while the tube rotates but is held against axial movement.

Plasticized thermoplastic material which is being extruded from the nozzle 3 forms a strip as a result of rotation of the tube 1' and contacts the external surface of the tube to become attached thereto in the form of contiguous helical convolutions merging with each other as a result of the material of the strip being in a plasticized state, so as to form a continuous coat 2'. A support roller 10 is located substantially opposite the extruder nozzle 3 to hold the tube against deflection thus keeping constant the distance between the orifice of the extruder nozzle and the tube to be coated and the thickness of the coat. While this method has been described as being used for coating continuous tubes, it is to be understood that it can also be used for coating of tubes of finite length.

Upon completion of the coating operation, the rube 1' with the thermoplastic coat 2' applied thereto is subdivided into tubular sections each including a metallic core 1 whose external surface is surrounded by a portion or sleeve 2 of the coat 2'. The length of the cores 1 equals or approximates the desired length of rollers. The thus obtained semi-finished product is then clamped at its outer surface, i.e., at the outer surface of the sleeve 2, and the end portions 1a of the core 1 are counterbored so that their internal diameters exceed the diameters of two cylindrical inserts 4. The end faces 1b of the core 1 are bevelled so that they flare radially outwardly and may but need not abut against complementary surfaces on the flanges 4a of the respective inserts 4. The inserts 4 preferably consist of synthetic plastic material which can be bonded to the material of the sleeve 2. In the illustrated embodiment, each of the inserts 4 is provided with a shaft 5 of stainless steel; however, any other supporting and coupling means, such as sockets for accommodation of trunnions external to the roller may be used.

In the presently preferred embodiment, the material of the inserts 4 corresponds to the material of the sleeve 2. The end portions of the sleeve 2 may extend beyond the end faces 1b of the core 1 so that the latter need not contact the flanges 4a. These flanges are bonded to the sleeve 2 by means of a suitable adhesive, by welding or in any other suitable way which insures that the sleeve 2 and flanges 4a form a fluidtight and corrosion-resistant envelope around the metallic core 1.

The inserts 4 are provided with axial bores 4b which receive splined or toothed end portions of the respective shafts 5. The shafts 5 are permanently attached to the respective inserts 4 by an adhesive, by injection of the material of the inserts into a mold into which the splined portions of the shaft extend, or by sonic welding. The latter procedure consists in subjecting a shaft 5, while being forced into the respective insert 4, to vibrations at least in the sonic range, with resulting development of heat in the regions immediately bordering and contacting the shaft 5, caused by the friction between the surfaces of the shaft and the insert with attendant partial melting of the insert. Such partial melting facilitates the introduction of the shaft into the insert and insures the formation of a permanent bond when the molten material of the insert is caused or allowed to set.

The currently preferred method of manufacturing the roller illustrated in FIG. 1 will now be described. As already explained above, the metallic tube 1' is first provided with a coat 2' having a sufficient thickness so as to allow for subsequent finishing operations, and then cut or otherwise subdivided into sections each of which includes a metallic core 1 provided with a sleeve 2 and having a length corresponding to the desired length of the cylindrical part of the roller. Subsequently thereto, the thus obtained semi-finished product is clamped at the inner surface of the core 1, and the external surface of the sleeve 2 is coarsely machined by turning or other material-removing operation so as to provide the sleeve with an external surface which is coaxial with the internal surface of the core 1. Subsequently thereto, the semi-finished product is clamped at the thus coarsely machined external surface, and the end portions 1a of the core are counterbored by turning or a similar material-removing operation along a length at least matching the length of those portions of the inserts 4 which are to be inserted into the core 1. The internal surfaces of the end portions 1a are coaxial to the outer surface of the coat 2 and to the remaining, nonmachined central portion of the inner surface of the core. The inner diameters of the end portions 1a are preferably slightly larger than the outer diameters of the main portions of the inserts so as to facilitate the introduction of inserts into the respective end portions 1a. Simultaneously therewith, or subsequently thereto, the metallic core 1 is provided with the outwardly flaring end faces 1b which are preferably recessed in respect to the end portions of the sleeve 2. The next step consists in introduction of the inserts 4, which are assumed to be provided with the shafts 5, into the respective end portions 1a of the core 1 with simultaneous establishment of a permanent bond between the flanges 4a of the inserts 4 and the sleeve 2, e.g., by glueing or any other procedure insuring a permanent seal and a chemically resistant bond between the inserts 4 and the sleeve. One of the alternative methods of bonding comprises thermal welding of the flanges 4a to the sleeve 2. Subsequently thereto, the thus obtained roller is supported on the shafts 5 which are coaxial with the core 1 and hence with the outer surface of the sleeve 2, and the outer surface is machined to eliminate surface roughness in a shaving-or chip-removing operation such as, for instance, turning or grinding. Experience has shown that best results are obtained if the surface is turned using a diamond cutting tool, the obtainable peak-to-valley height amounting to approximately 4 mm. While this surface quality is sufficient for most applications of the roller, it can be further improved by subsequent chemical smoothing operations, such as application of a solvent to the surface to be smoothed, or thermal smoothing operations, such as utilizing frictional heat between the smoothing tool and the surface to be smoothed, blowing hot air or other gas against the surface, or smoothing by radiated heat. Experience gained in prolonged tests has shown that the thus obtained rollers satisfy all criteria required from them if they are to be utilized in a developing apparatus for photographic strip or sheet materials, i.e., that they are sufficiently rigid so as not to buckle in actual use while the chemical resistivity afforded to them by the coat is sufficient for their utilization in all stages of the process.

The counterboring of the cores 1 can be dispensed with if the tube 1' consists of accurately calibrated tubular metallic stock having a constant wall thickness.

FIGS. 3 and 4 show a second embodiment of the improved roller. A metallic tube, preferably consisting of aluminum, is cut or otherwise subdivided into cores 6 of predetermined length. Subsequently thereto, inserts 7 with shafts 8 bonded thereto are introduced into the end portions of the core 6, and centered therein axially with respect to the core by moving the flanges 7a of the inserts 7 into abutment with the respective end faces of the core. The outer surfaces 7b of the inserts abut against the inner surface of the core 6, thus making the inserts 7 and their shafts 8 coaxial with the core 6. The material of the inserts 7 is preferably identical with that of a thermoplastic sleeve 9 for the core 6. Each shaft 8 is held in the respective insert 7 by four internal ribs 7c which allows for some deformation of the insert if the inner diameter of the core 6 is too small to receive the insert without deformation. If inserts of such a configuration are used, the machining of the inner surface of the core 6 can be avoided in most cases.

The thus obtained semi-finished product, i.e., the core 6 with the inserts 7 and shafts 8, is then introduced into an injection mold of conventional design, which is well known and thus not illustrated. A thermoplastic material, preferably the same as the material of the inserts, is then injected into the mold so as to provide, in a single operation, a coat or envelope 9 around the exposed surfaces of the semi-finished roller and fill the voids between the ribs 7c. The injected material is preferably hard polyvinyl chloride, but any other suitable material may be used as well. According to a presently preferred embodiment, the mold consists of two mirror-symmetrical parts which have sockets for the shafts 8 and whose inner dimensions exceed the outer dimensions of the exposed surface of the roller by the intended thickness of the coat, and the injection openings are located so as to face the end faces of the roller and thus the inserts. The latter expedient facilitates the penetration of plasticized material into the voids between the ribs 7c. Since the thus formed coat surrounds all the exposed surfaces, i.e., the external surface of the core and the exposed external surfaces of the inserts, these parts are automatically sealingly bonded to each other.

After the core has been coated, the roller is supported by the shafts 8 and the external surface of the coat 9 is machined, for instance turned, in one or more stages, to obtain the final quality of the surface of the roller.

The manufacturing cost of this roller is even less than that of the roller shown in FIG. 1; however, the requirements for the quality of the injection molding process are high, since only minute quantity of gaseous inclusions in the material being injected into the mold to form the coat around the metallic core is permitted. Larger quantity of such inclusions or bubbles would result in porousness of the coat 9 and, in addition to imparing the quality of the surface of the roller, these inclusions might result in loss of protective quality of the coat 9 so that the chemically active medium may reach the core and thus corrosion thereof may occur. Therefore, it is highly desirable that the quantity of entrapped gas be kept to a minimum, advantageously by evacuation of the material to be injection molded.

It has been disclosed above in connection with both embodiments of the rollers, that the semi-finished coated rollers are machined for improvement of the surface quality of the rollers. Thus, it is evident, that the coat of the rollers has to have sufficient thickness to allow for removal of a portion thereof during the machining operations. As already mentioned above, it is desirable that the coat be at least 2 millimeters thick. The additional advantages gained by providing such relatively thick coating are that even if the core is not completely rotationally symmetrical, the material-removing operations will not remove all of the chemically resistant coating in some regions of the roller, so that the core may be allowed to deviate from the ideal cylindrical shape to a certain degree without substantially impairing the lifetime or performance of the roller. In addition thereto, the substantial thickness increases the lifespan of the roller by providing a larger quantity of material which can be worn off before the metallic core is exposed.

The thus manufactured roller, which has a surface of high quality, is superior to heretofore used rubber of rubber-coated rollers. For example, the improved roller is not likely to accumulate remnants of gelatin. This is particularly advantageous since the removal of gelatin from rubber-coated rollers presents many problems. Moreover, the improved rollers are less susceptible than any of the heretofore known rollers to wear resulting from contact and friction between the rollers and conveyed photographic material, particularly to wear resulting from the action of leading edges of webs of photographic material upon the surfaces of the rollers.

It will be understood that each of the rollers described above, or two or more together, may also find a useful application in other types of apparatus differing from the type described above.

While the invention has been illustrated and described as embodied in apparatus for wet treatment of photographic materials, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpont of prior art, fairly constitute essential characteristics of the generic or specific aspects of our contribution to the art and, therefore, such adaptations should and are intended to be comprehended within the meaning and range of equivalence of the claims.

What is claimd as new and desired to be protected by Letters Patent is set forth in the appended claims:

1. A roller, particularly for use in apparatus for wet treatment of strip or sheet material with aggressive fluids, comprising an elongated metallic core having two spaced end portions and an outer surface; a cylindrical coat of chemically resistant thermoplastic material immediately adjacent to said outer surface and having end openings adjacent said end portions of said core; and two side elements of synthetic plastic material fully overlapping said end openings of said coat and having portions received in said end portions of said core, said side elements having coupling means coaxial with said core and being sealingly bonded with said coat so that said side elements and said coat together form a closed fluid tight and corrosion-resistant envelope of synthetic plastic material around said metallic core to protect the same from attack by said aggressive fluids.

2. A roller as defined in claim 1, wherein each of said synthetic plastic side elements has a transversely complete cross-section at least equal to the respective inner dimension of the respective end opening.

3. A roller as defined in claim 1, particularly for use in apparatus for multistage wet treatment using a plurality of different aggressive fluids, wherein said cylindrical coat is of a material selected from the group consisting of hard polyvinyl chloride, crystalline polyamide, polypropelene, polyethelene and their combinations so as to be resistant against said plurality of said fluids.

4. A roller as defined in claim 1, wherein said coat has open ends adjacent said end portions of said core and forming respective edge portions, and said side elements have flanges adjacent said end portions of said core and extending axially outwardly of said core in a direction substantially transverse to the latter, said edge portions of said coat being bonded with said flanges of said side elements.

5. A roller as defined in claim 1, wherein said side elements are provided with axial bores; and said coupling means are shafts having portions thereof provided with radially extending projections, said portions of said shafts being received in said bores of said side elements and fixedly connected to the latter.

6. A roller as defined in claim 1, wherein each of said coupling means is a shaft; and each of said side elements is provided with radially extending ribs, said shaft being inserted between said ribs.

7. A roller as defined in claim 6, wherein said ribs form voids therebetween, said voids being filled with thermoplastic material.

8. A roller as defined in claim 1, wherein said end portions of said core are provided with counterbores, said portions of said side elements being received in said counterbores.

* * * * *